May 19, 1931.    N. ARFSTEN    1,806,190
METHOD OF OBTAINING STEREOSCOPIC IMPRESSIONS OF MOVING PICTURE IMAGES
Filed Jan. 6, 1928    7 Sheets-Sheet 1

INVENTOR.
Newton Arfsten
BY
C. P. Goepel
his ATTORNEY.

May 19, 1931.  N. ARFSTEN  1,806,190
METHOD OF OBTAINING STEREOSCOPIC IMPRESSIONS OF MOVING PICTURE IMAGES
Filed Jan. 6, 1928   7 Sheets-Sheet 2

INVENTOR.
Newton Arfsten
BY
C. P. Goepel
his ATTORNEY.

May 19, 1931.  N. ARFSTEN  1,806,190
METHOD OF OBTAINING STEREOSCOPIC IMPRESSIONS OF MOVING PICTURE IMAGES
Filed Jan. 6, 1928   7 Sheets-Sheet 4

INVENTOR.
Newton Arfsten
BY
C. P. Goepel
his ATTORNEY.

May 19, 1931. N. ARFSTEN 1,806,190
METHOD OF OBTAINING STEREOSCOPIC IMPRESSIONS OF MOVING PICTURE IMAGES
Filed Jan. 6, 1928    7 Sheets-Sheet 5

INVENTOR.
Newton Arfsten
BY
C. P. Goepel
his ATTORNEY.

Patented May 19, 1931

1,806,190

UNITED STATES PATENT OFFICE

NEWTON ARFSTEN, OF NEW YORK, N. Y.

METHOD OF OBTAINING STEREOSCOPIC IMPRESSIONS OF MOVING PICTURE IMAGES

Application filed January 6, 1928. Serial No. 244,849.

This invention relates to a method of projecting moving picture images to produce a three-dimensional impression on observers, and to an arrangement and apparatus for carrying out the aforesaid method.

A well known method of producing a three-dimensional impression on observers is based on the use of two stereoptical pictures, namely, of a left-eye picture and of a right-eye picture. The left-eye picture represents that view of an object which is seen with the left eye, while the right-eye picture represents the view simultaneously received of the same object by the right eye. If the object is subjected to variations, for instance to a movement, both pictures must be taken simultaneously. In order to produce the three-dimensional impression on an observer, either stereoptical picture must be individually presented to the corresponding eye. It is not an absolute requirement, however, to present both pictures simultaneously, but the desired effect will also be obtained if both pictures are alternately seen by the observer in so rapid a succession as to produce a uniform impression. In the case of a moving picture, the right-eye view and the left-eye view are projected on the screen in alternation. In order to produce a correct three-dimensional impression, both projections must be so positioned on the screen in relation to each other that the representation of a relatively distant object, such for instance as a far off mountain peak, will appear on the screen in the left-eye projection about 2½ inches left from the representation of this object in the right-eye picture, the distance of 2½ inches being the average distance between the eyes. It is obvious that in the case of alternative projections, while the one eye is receiving an impression, the other eye must be shielded or otherwise protected from receiving impressions interfering with the observation.

My invention relates to a novel way of preventing the one eye from seeing while the other eye receives a picture impression, and consists in producing in the eye to be shielded a uniform, homogeneous light impression which is free from marked or conspicuous points, and is so strong as to extinguish any other weaker impression which otherwise might be perceived. From another aspect, my invention provides for an arrangement which shields the non-seeing eye for the proper intervals in a novel manner which does not involve the placing of an object such as a rotary shutter or the like in front of the observer's face or the provision of other uncomfortable instrumentalities. My invention is based on the fact that the ability of the one eye of perceiving or seeing a certain view remains unaffected by a light impression created in the other eye providing that such light impression is entirely uniform and homogeneous. I utilize furthermore the fact that a sudden light such as a flash or a short projection of a picture will be perceived by the human eye only after a certain interval has elapsed. The length of this interval, i. e., the interval between the actual emission of light rays and their perception by the human eye and brain, will be hereinafter referred to as "perception time". The same depends to a large extent on the intensity of the light projection. The stronger the light, the shorter will be the perception time. One and the same light projection appears in a less degree of brightness, if the eye receives an additional light. This additional light may be thrown into the eye from the side or from some other place surrounding the light projection. The stronger such additional light is, the longer will be the perception time of the light projection. Under the condition that the additional light appears in a certain (red) color, only the perception time of the same (red) colored light will be prolonged and the perception time of the contrasting (green) light will be of a shorter endurance.

A light projection in a darkened room will be perceived by the human eye only, after a long perception time, if the eye is in a state of adaptation such as created by the daylight. But staying in the darkened room, the perception time gradually becomes shorter and shorter until a certain point is attained. At this point, which will be hereinafter referred to as "critical state" the perception time is suddenly prolonged for a little while. Passing this critical state the perception time again becomes shorter and shorter until the eye receives its greatest sensibility in the socalled state of dark-adaptation. As during the expiration of the state of adaptation created by day-light and that of dark-adaptation the critical state of a blue light appears previously to the other colors, of which the red one is the last, it is possible to accomplish a certain state of adaptation during which the perception time of a red light is shorter than that of a blue one and another certain state of adaptation during which the perception time of a blue light is shorter than that of a red one.

Various embodiments of my invention are illustrated in the accompanying drawings.

Similar characters of reference indicate corresponding parts throughout the various views.

Figure 1:
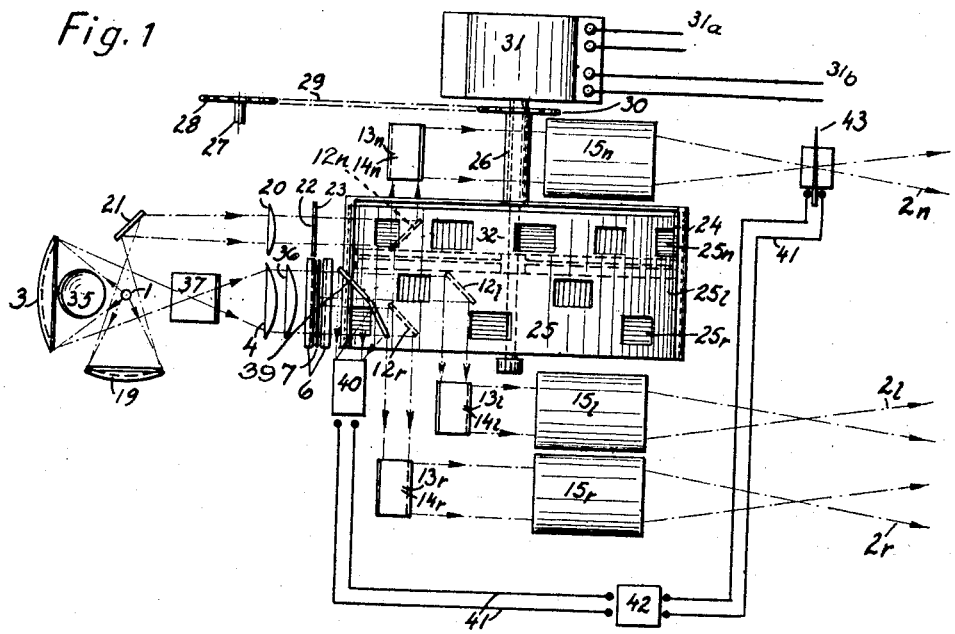
Fig. 1 shows a plan view of a moving picture projecting apparatus for carrying out my novel method.

In Fig. 1 the source of light for projecting the pictures on the screen is designated by 1, the light beam magnified by the reflector 3 and intensified by the lens 4, passes through the film 7 which is guided in a well known manner through guide members 6 provided with a window 5. The film is preferably continuously fed to the projecting apparatus by means of a feeding roller 8 and is intermittently drawn past the window 5 by suitable means well known in the art. These means may comprise, for instance, a pair of rollers coupled with a Maltese-cross gear 10, which is intermittently rotated by a one-tooth gear 9 continuously driven with such a speed as to impart to the film about 16 motion impulses per second, each impulse transporting the film by the length of a picture. As such a driving mechanism is well known in the art, a detailed description thereof may be dispensed with.

Figure 3:
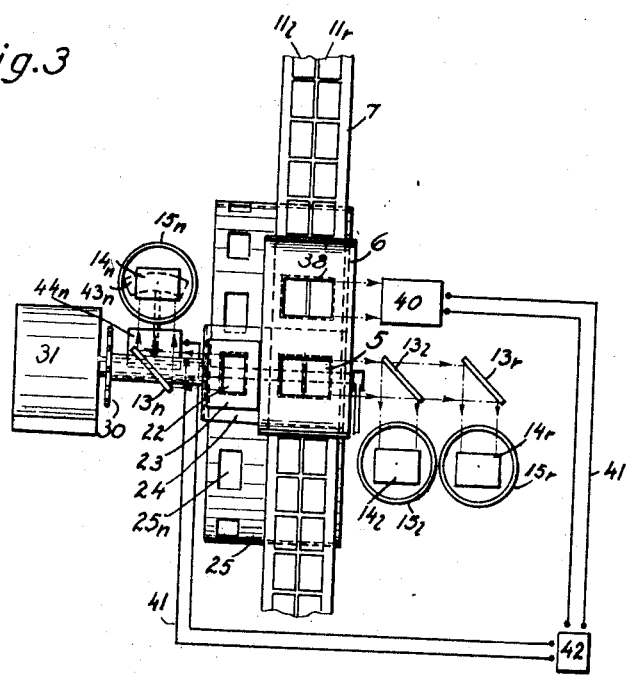
Figure 4:
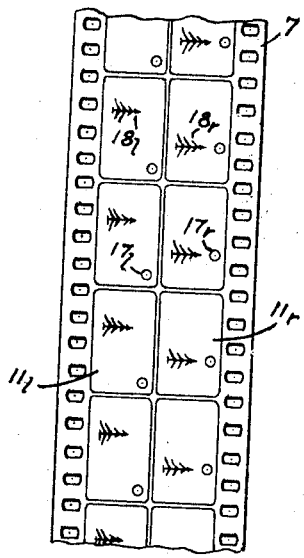
Fig. 4 is an illustration of a film to be used in connection with this apparatus.

The film 7 contains two rows of pictures, the one row $11_r$ (Figs. 3 and 4) representing the right-eye pictures and the other row $11_l$ the left eye pictures, corresponding pictures, i. e., pictures simultaneously taken, being adjacent to, and registering with each other. The size of the pictures is preferably so chosen that a film band of standard width may be used. In the represented embodiment, the pictures are rectangularly arranged with respect to the customary arrangement, a horizontal line represented in a picture extending lengthwise the film band.

The beam 2 passing the window 5 and the film 7 guided therein is divided by the two pictures shown in the window into a beam $2_l$ and a beam $2_r$. Each beam is first laterally deflected by a mirror $12_l$ or $12_r$ respectively (see Fig. 1), then it is downwardly deflected by a mirror $13_l$ or $13_r$ respectively and is finally directed by a mirror $14_l$ or $14_r$ respectively, and projected through a lens set $15_l$ or $15_r$ respectively and on the screen. The various mirrors are so adjusted that the left-eye representation on the screen of a very remote point is spaced by about 2½ inches leftward from the representation of the same point in the right-eye picture. In addition to the two beams $2_l$ and $2_r$, a third neutralizing beam $2_n$, the purpose of which will be explained hereinafter, is projected on the screen in predetermined intervals. This beam $2_n$ ($2_n$) is derived from the source 1 by a mirror 21 and a reflector 19 and directed to the screen by a lens 20, mirrors $12_n$, $13_n$, $14_n$ and a lens set $15_n$. Between the lens 20 and the mirror $12_n$ a frame 23 provided with a window 22 is arranged, the size of the window 22 being such that the beam covers at least the area on the screen which is occupied by the projections of the pictures. A rotary shutter comprising two or more discs 24 supported on the ends of rotating arms mounted on a hollow axle 26, is so arranged that it interrupts intermittently the beams $2_l$, $2_r$ and $2_n$ as will be seen from Fig. 1. The axle 26 is coupled with a sprocket wheel 30 which is driven by a chain 29 engaging a second sprocket wheel 28. The wheel 28 is connected with the continuously rotating gear 9. Whenever the film displayed in the window 5 is moved, one of the discs 24 passes in front of the windows 5 and 22 and cuts off the beams gradually, thereby preventing a projection from the moving film. The other discs 24 cut off the beams temporarily while the film is stationary. The purpose of this interruption is to diminish the glimmering of the picture.

A rotating drum-shaped shutter 25 provided with three circumferentially disposed rows of windows $25_l$, $25_r$ and $25_n$ is so mounted in the apparatus that said three rows of windows register with the three beams $2_l$, $2_r$ and $2_n$ and are intermittently transversed thereby. The drum mounted on an axle 32 is uniformly driven by a motor 31. The arrangement of the mirrors $12_l$, $12_r$, $13_l$, $13_r$, $14_l$, $14_r$ and the lenses $15_l$, $15_r$ being so provided, that the light projections $2_l$, $2_r$, $2_n$ on the screen 16 are extinguished beginning from one and the same side, if the discs 24 or the shutter 25 are rotating. Under the condition that the size of the openings $25_l$, $25_r$, $25_n$ are smaller than the heights of the pictures $11_l$, $11_r$ or of the window 22, the light projections $2_l$, $2_r$, $2_n$ on the screen 16 will appear as small vertical stripes. The manner in which the disposition of the windows determining the time for which the individual beams are cut off, is designed will be explained hereinafter.

Figure 14:
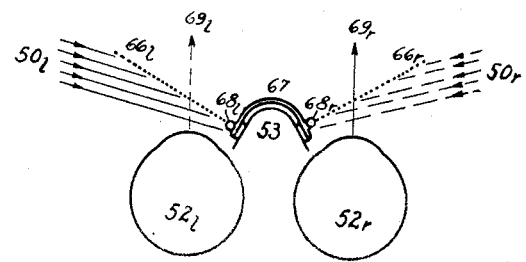
Fig. 14 shows a spectator equipped with a reflecting device.

The theater room (Figs. 6 to 8) is equipped with lamps or other sources of visible or invisible (infra-red, ultra-violet) light $51_l$, $51_r$, which are arranged on the right and on the left hand side in such a manner as to project light rays in a predetermined direction only. The rays $50_l$ coming from the left hand side are so directed as to act substantially on the left eye only of any properly seated spectator while the rays $50_r$ act only on the right eye. Such an arrangement is rendered possible by the screening effect of the nose which protects either eye from the rays coming from the other side as will be seen from Fig. 8. A nose 53 of average dimensions cuts from the total field of view 55 a small lateral monocular part $55_l$ or $55_r$ respectively, on either side which is available to one of the eyes $52_l$ and $52_r$ only. As experience has shown that the spectators do not move their heads while looking at the performance on the screen 16, the rays $50_l$ or $50_r$ may be sent in any direction which lies within the limits of the monocular fields of view $55_l$ or $55_r$. In case of an abnormal shape of face which does not provide for sufficiently large monocular fields of view, or in case of spectators seated so far in front that they want to move their heads to better observe the performance, an artificial nose prolongation member 54 (Figs. 12 and 14) may be used. This member may consist of cardboard and may be attached to the nose in any suitable manner. The sides of the member may be white or colored to correspond to the colors of the sources of light $51_l$, $51_r$. The sources of light arranged on the sides of the theater room may be formed by incandescent lamps or glowing tubes $51_l$, $51_r$ as indicated in Fig. 8, or a plurality of mirrors (Fig. 12) receiving light from central sources $60_l$ or $60_r$. In order to prevent the radiation of light in undesirable directions, screens $56_l$, $56_r$ (Fig. 8) may be provided or, in the case of mirrors as sources of light, mirrors of a small breadth may be used and properly adjusted.

Figure 6:
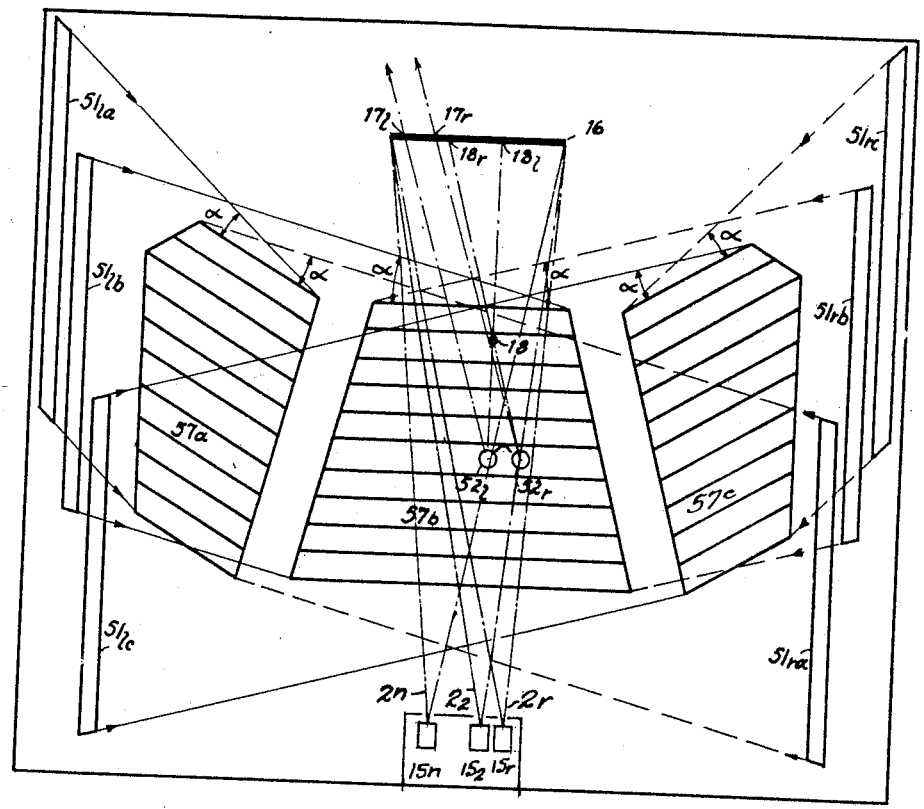
Fig. 6 illustrates a plan view of a theater room equipped with the novel apparatus.
Figure 7:
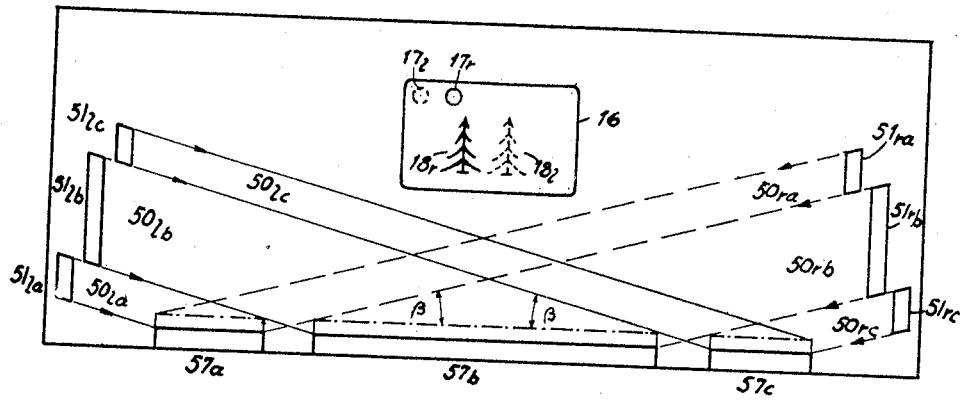
Fig. 7 is a rear elevation thereof.
Figure 8:
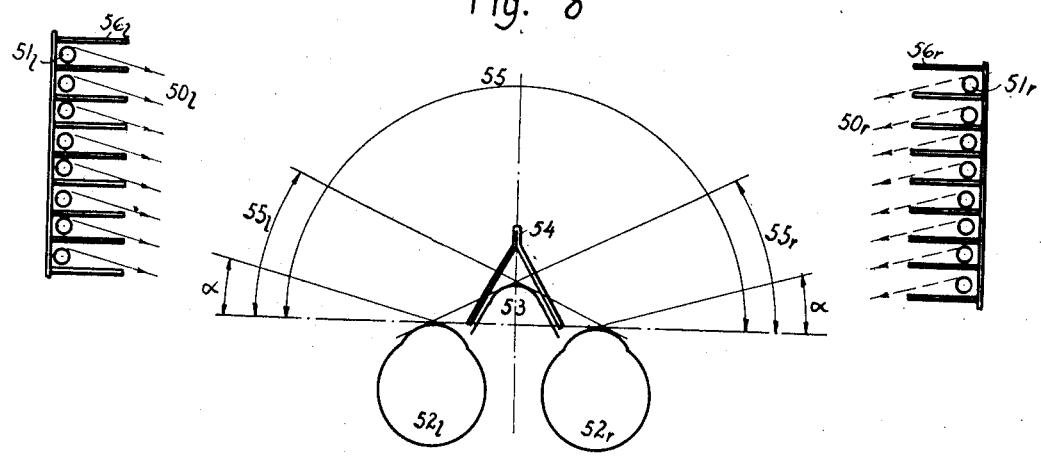
Fig. 8 is a diagrammatical representation of an observer properly seated in the theater and equipped with a nose piece.

In Figs. 6 and 7 I have shown a theater room in which the seats are arranged in three groups and in concentric arcs so that the heads of the spectators are radially directed towards the screen 16. For each group of seats an individual group of light rays is produced so that each spectator will receive the side lights under the proper angles and regardless of the group in which he is seated. The left group of seats $57_a$ is exclusively exposed to the rays coming from the source $51_{la}$ or $51_{ra}$ respectively. The central group $57_b$ receives only rays from the source $51_{lb}$ or $51_{rb}$ while the group on the right is exclusively exposed to the rays coming from $51_{lc}$ or $51_{rc}$.

The arrangement heretofore described may be operated in various manners. According to the preferred modification of my invention the lateral sources of light $51_l$ and $51_r$ deliver light of different colors or intensity. The source $51_l$ for instance may deliver a red light while the source $51_r$ supplies a green light. Various well known ways are available for obtaining lights so colored. The sources of light may be provided with a colored light filter permitting rays of a certain color only to pass while absorbing all other rays, or the light beam coming from the source may be divided into its differently colored constituents by means of a prism, whereupon the rays of a certain color are sent into the desired direction, the remaining rays being deflected and finally absorbed by suitable screens.

The differently colored lights acting on the eye of any observer have the effect of bringing both eyes into a different state of adaption. A certain red light such as a projection of a red colored picture will appear darker to the left eye than to the right eye. A green light will have the reversed effect, appearing brighter to the left eye than to the right one. Another effect of the different state of adaption of both eyes is that the perception time in the case of a red light is longer for the left than for the right eye.

Figure 9:
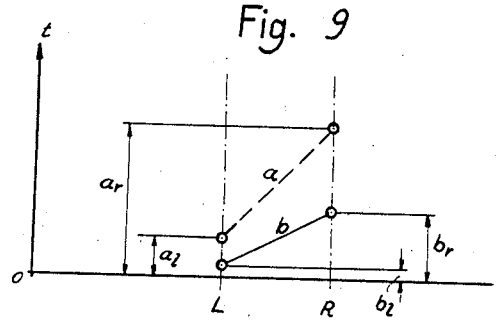
Figs. 9 and 10 are diagrams illustrating the perception times of different lights as different states of adaption; the times being represented by the ordinates.

Fig. 9 illustrates the various perception times. A green light $b$ projected at the time $o$ will be perceived by the left eye at the time $b_1$, as indicated by the corresponding point on the vertical line marked L. The right eye will perceive the same projection $b$ at the time $b_r$. A green light $a$ which is less intense than the light $b$ will not be perceived by the eyes before the expiration of the times $a_1$ and $a_r$.

Figure 10:
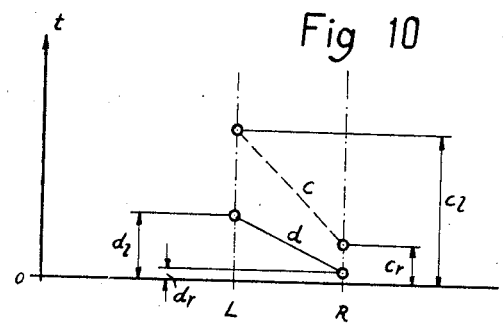

Fig. 10 illustrates the perception times for two different red light projections $c$ and $d$ which will be perceived by the eyes L and R after the expiration of $c_1$ and $c_r$ or $d_1$ and $d_r$ respectively.

Figure 11:
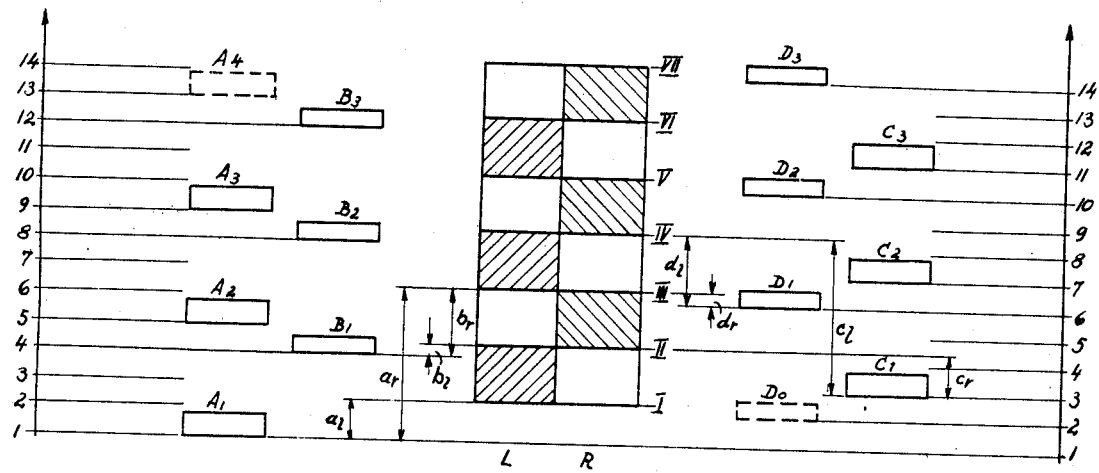
Fig. 11 is a diagrammatical representation of the sequence of right-eye projections and left-eye projections and the neutralizing light projections and of the sequence in which they are perceived by the eyes of a spectator.

Fig. 11 illustrates the successive projections of the pictures and of the neutralizing light in their timed relation. $A_1, A_2, A_3, A_4$ represent projections of left eye pictures, beginning at the times 1, 5 and 9 and lasting approximately for one time unit. The light beam $2_1$ projecting these pictures is composed of green rays which may be obtained by means in the manner described in connection with the colored lights $50_1$ and $50_r$.

$C_1, C_2, C_3$ represent projections of right eye pictures beginning at 3, 7, 11 and performed by means of the beam $2_r$, which is red.

$B_1, B_2, B_3$ and $D_0, D_1, D_2, D_3$ are projections of the bright neutralizing beam $2_n$ beginning at the times, 2, 4, 6, 8, 10, 12, 14 and lasting preferably for a somewhat shorter time than the picture projections $A_1, A_2, A_3, A_4$ and $C_1, C_2, C_3$, as will be explained later. The neutralizing projections have a different color in alterations, the projections B being green and the projections D being red. These colors may be obtained by inserting green and red respectively light filters into alternating windows $25_n$. The intensity of the beam $2_n$ is so regulated that the neutralizing projections are three to four times as bright as the picture projections. As a short light projection lasting a certain time is perceived by the eye for a time exceeding the time of the actual projection by a certain amount which is in proportion to the light intensity, the relatively strong neutralizing projections being shorter than the picture projections are nevertheless perceived for the same length of time. Fig. 11 indicating the time and the length of every projection forms a basis for the design of the width and the distance of the windows $25_1, 25_r$ and $25_n$.

An example of the sequence and time intervals of the projection of the light rays $2_1$, $2_r$, and $2_n$ is as follows:

The green left-eye picture image is projected for approximately .0008 of a second on the screen a time interval of approximately .0002 of a second in which there is no projection on the screen follows, then a neutralizing light projection of the red color for approximately .0006 of a second takes place, followed by a time interval of approximately .0004 of a second in which there is no projection, a red right-eye picture image is then projected for approximately .0008 of a second, a time interval of approximately .0002 of a second in which there is no projection follows, a neutralizing light projection of the green color as said right-eye picture image is projected for approximately .0006 of a second and a time interval of approximately .0004 of a second in which there is no projection completes one cycle. These time intervals can be varied to suit the projection of pictures and lights of different intensities.

The effect of these projections on a spectator is as follows:

The green projection $A_2$ of a left-eye picture beginning at the time 5 will first be perceived by the left-eye after the expiration of $a_1$ time units, i. e., in the represented example at the time III. While the actual projection lasts approximately for one time unit, its perception continues for two units, i. e., till the time IV. This period of perception by the left eye is indicated by a cross-hatched square in the column marked L in the center of Fig. 11. While the left eye is perceiving the projection $A_2$, the right eye receives simultaneously the impression of the three projections $A_1, B_1$, and $D_1$. The green projection $A_1$, beginning at the time 1 is first perceived $A_r$ units later, at the time III and lasts to the time IV. The bright green projection $B_1$ beginning at the time 4, is first perceived $br$ units later, at the time III and lasts also to the time IV. The bright red projection $D_1$ beginning at the time 6, is perceived $d_r$ units later, at the time III as shown in the diagram. The perception lasts until the time IV. As the bright projections B and D are much brighter than the picture projection A and represent themselves simply as a uniformly lighted area being produced by the neutralizing beam $2_n$, they have the heretofore explained effect of extinguishing in the right eye the impression which otherwise might be created by the picture projection A without interfering, however, with the simultaneous activity of the left eye. This effect on the right eye is symbolized by a plain square in the column marked R in Fig. 11.

At the time IV, the right eye begins to perceive the red picture projection $C_2$ which follows the neutralizing projection $D_1$. This reception period lasting from the time IV to the time V is indicated by a cross-hatched square in the column R. The left eye receives simultaneously the impression of the projections $C_1, D_1$ and $B_2$, the projections $D_1$ and $B_2$ representing neutralizing projections which extinguish any impression that might be created by the projection $C_1$. For the left eye the perception times of the projections $C_1$, $D_1$ and $B_2$ are $c_1$ $d_1$ and $d_1$ respectively. In the following period from time V to VI it is again the left eye that perceives a picture projection $A_3$ while in the other eye any impression possibly created by the preceding projection $A_2$ is extinguished by the neutralizing projections $B_2$ and $D_2$.

From the foregoing, it will be clear that any picture projections may be clearly perceived by the respective eye, while the other eye is subjected to a uniform strong light impression which, however, due to its uniformity, does not interfere with the visibility of the picture. I have found that the periods during which pictures are perceived, follow each other without interruption as is the case in the described example, a spectator will never gain an impression of blurring of the moving picture which might be expected from the intermittent neutralizing light projections.

The light intensities for the four different projections and for the lateral lights must be so chosen that the resulting perception time $a_r$ equals $c_1$ and $b_r$ equals $d_1$. I have found that if this condition is complied with, the equality of the reception times $a_1$ and $c_r$ as well as of $b_1$ and $d_r$ results coincidentally under the condition that proper tints of the light colors are used.

In determining the length of time of the various projections, the following phenomenon must be taken in consideration. A short projection, shorter than 1/50 sec., will first be perceived after the expiration of the perception time. Some time after this impression which lasts for a certain period has ceased, the eye receives a second impression of the projection which has the color and about the same intensity as the first impression and which lasts approximately the same length of time. The interval between the two successive impressions created by the same light projection is known as the dark interval. The succession and length of the various projections A, B, C and D must be so chosen that an impression created by a picture projection is perceived during the dark interval which follows the impression of the preceding neutralizing projection. Unless this condition is complied with the picture will not clearly be perceived owing to the interfering second perception of the neutralizing projection.

As the perception times $a_1$ and $c_r$ of the picture projections depend upon the light intensity thereof, they will vary if the light intensity varies as may be the case if the movie picture shows in succession, for instance, bright landscapes and dark streets.

In order to compensate for such variations, the intensity of the lateral lights is preferably varied in correspondence with the variations of the picture projections, whereby the absolute length of the perception times is kept constant. The means for varying the lateral lights will be described hereinafter. If a series of particularly bright picture projections will occur in the performance, which have the tendency of being prematurely perceived by an observer, the intensity of the lateral lights is correspondingly magnified whereby the sensibility of the observer's eyes is diminished to a certain degree. The perception time, consequently, will be kept unvaried. In order to avoid a change in the perception times of the neutralizing projections, the intensity of the same is also varied in correspondence with variations of the picture projections.

Figure 5:
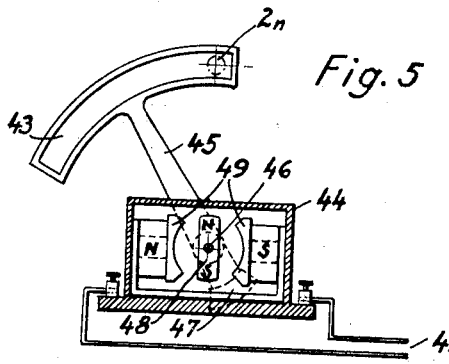
Fig. 5 shows an apparatus for compensating for variations of the light intensity of the projections.

The control of the intensity of the lateral lights and of the neutralizing light beam $2_n$ may be automatically performed by the mechanism illustrated in Fig. 5; 43 represents a movable transparent plate or screen, the transparency of which decreases gradually from one end towards the other. This plate is arranged in front of the source of light to be controlled as the source $2_n$ or the lateral lights. By displacing the screen 43 any desired percentage of the light may be absorbed. The screen 43 is attached to the rotatable axis 46, on which an armature 48 and a weight 47 are mounted. The armature is subjected to the action of two electromagnets 49 which may be energized by a current supplied by the line 41.

Figure 2:
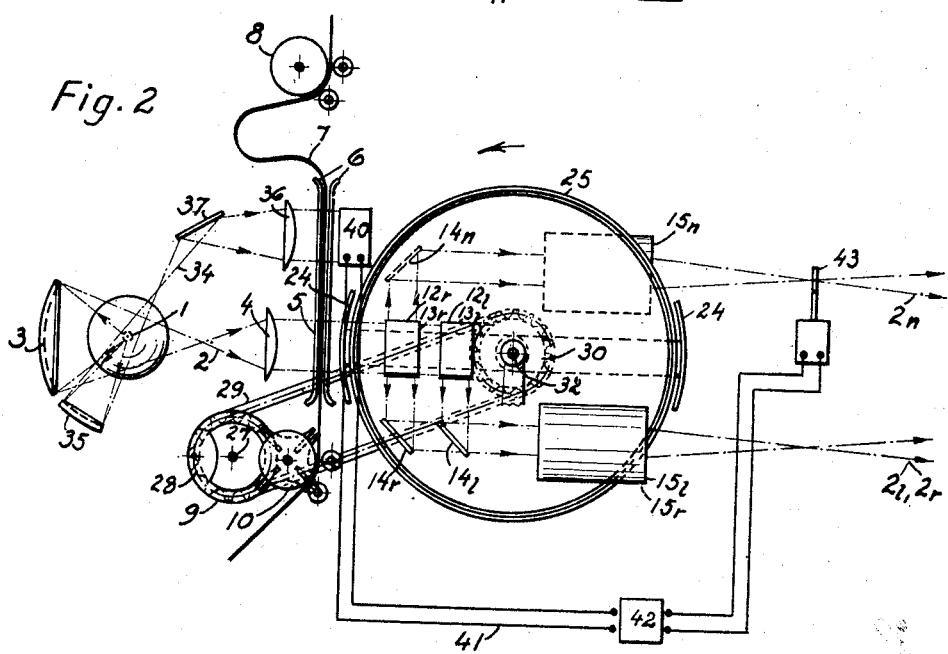
Figs. 2 and 3 are a side view and a rear view, respectively, the lamp casing and the film moving device being omitted in the rear view.

By means of reflectors 35 (Fig. 2) and 37 and of a lens 36, a light beam 34 is thrown through the window 38 (Fig. 3) past which the film is running. Behind the window 38 a mirror 39 is placed, reflecting the light beam into a photoelectric element 40, sensitive to variations of radiation. As such elements are well known, a description thereof may be dispensed with. The change of the radiation directed on the electro-optical element causes a corresponding variation in an electrical current conducted therethrough. The electrical current is conducted to a magnifying apparatus 42 (Fig. 2) and the magnified current is supplied to the magnets 49. When the radiation directed on the element 40 increases, owing, for instance, to the occurrence of a series of particularly bright pictures in the film, the energization of the magnets 49 is changed and the screen 43 is moved by action of the weight 47 to increase the intensity of the controlled light. As the adjustment of the screen 43 takes some time, the window 38 is so far spaced from the window 5 that the adjustment initiated by a certain picture passing the window 38 will have been completed when said picture reaches the window 5 and is then projected.

Instead of varying the lateral lights $50_1$, $50_r$, according to the brightness of the picture projections $2_1$, $2_r$, and the neutralizing light $2_n$, the speed of the rotating shutter 25 may be varied. Suppose the picture projections and the neutralizing light increase at the same percentage, the absolute lengths of the respective perception times become shorter, which requires a greater speed of the rotating shutter 25. This operation may be performed by the current of the photo-electric element 40 affecting the revolutions of the motor 31 in the usual manner.

Figure 15:
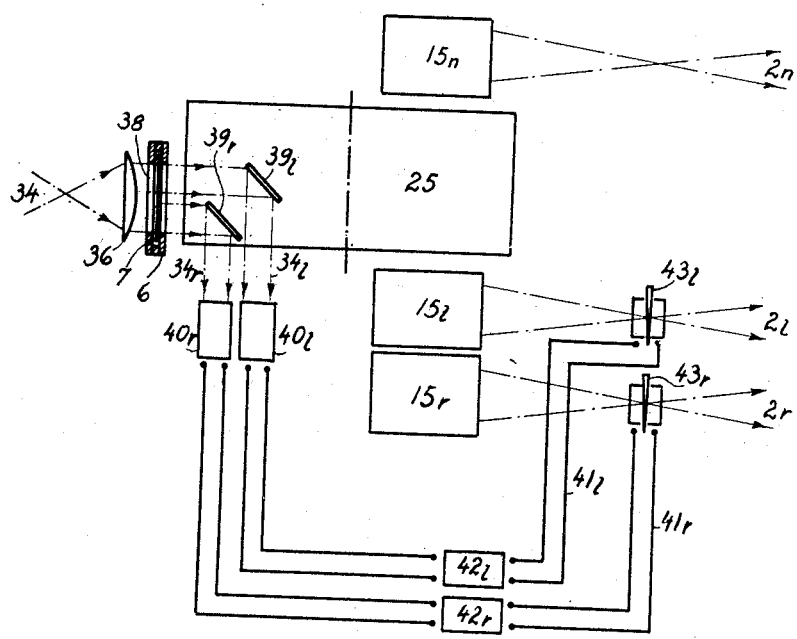
Fig. 15 is a diagrammatical representation of the arrangement of the novel apparatus for keeping the light intensity of the picture projections constant.

A third way is keeping the intensity of the picture projections $2_l$, $2_r$ constant, as for varying the neutralizing light $2_n$ and the lateral lights $50_l$, $50_r$ and the speed of the shutter 25 is not necessary. As it is possible that the left-eye and right-eye picture have a differing brightness, two transparent screens $43_l$, $43_r$ (Fig. 15) are required for regulating the left and right light beam $2_l$, $2_r$. The transparent screens are operated by the current of the elements $40_l$, $40_r$, which are induced by the respective light beams $34_l$, $34_r$, passing through the left-eye and right-eye picture of the film 7 and being thrown by the mirrors $39_l$, $39_r$ into the elements $40_l$, $40_r$. If for instance the new series of pictures are showing a greater brightness, the transparent screens $43_l$, $43_r$ diminish the intensity of the light beams $2_l$, $2_r$ in such a manner, that the lengths of the respective perception times do not vary.

As mentioned above, the critical state of two different colors being obtained by creating two certain states of adaptation only by varying the intensity of the lateral lights $50_l$, $50_r$, these light rays may have the same color but must be of a different intensity. In respect of the diagrams Figs. 9–11, where the light projections A and B may be of a bluish color, the right lateral light rays $50_r$ must be of a greater intensity than the left ones $50_l$. The left lateral lights may be removed, if the diffused light of the theater-room is sufficient, to bring the left eye in the certain state of adaptation.

Figure 16:
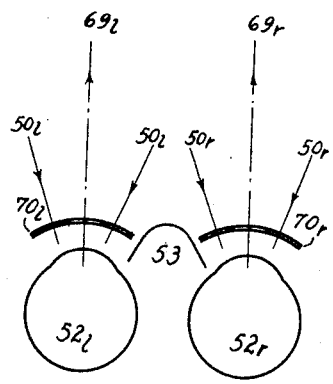
Fig. 16 is a diagrammatical representation of a spectator equipped with margin glasses.

Another way of creating a different state of adaptation is by wearing colored glasses, ($70_l$, $70_r$, Fig. 16) supplied with central looking holes. The margins of the glasses being of a different color or transparence, the light passing through creates the required differing states of adaptation of the left and right eye. By wearing those marginal glasses, the screen can be seen clearly while the eyes are protected from the usual lights in the theater.

Figure 12:
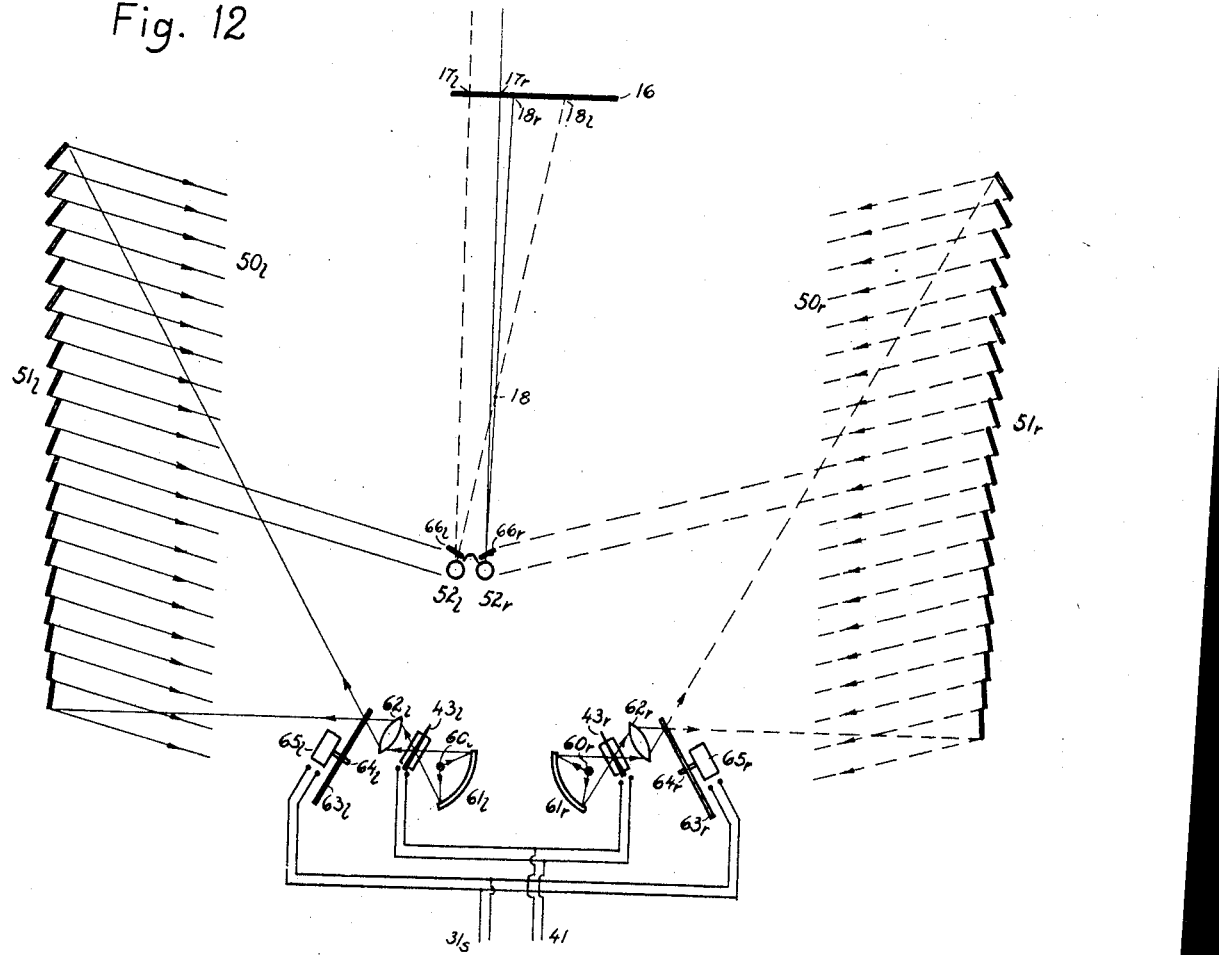
Fig. 12 illustrates a plan view of a theater room equipped with lateral lights alternately extinguished and released by rotating shutters.
Figure 13:
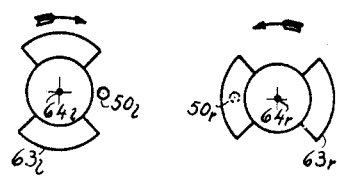
Fig. 13 shows the shutters thereof.

Another arrangement concerning the invention is as follows:

The left-eye and right-eye picture projections $2_l$, $2_r$ are thrown in alternation upon the screen 16 by means of the rotating shutter 25 (Fig. 12). The neutralizing light $2n$ is removed. The lateral lights $51_l$, $51_r$, which are extinguished and released by rotating shutters $63_l$, $63_r$ (Fig. 13) in synchronism to the picture projections $2_l$, $2_r$. The shutters mounted on axis $64_l$, $64_r$ are driven by small alternating current motors $65_l$, $65_r$ and running in synchronism to the motor 31. As soon as a left eye picture projection $2_l$ is appearing on the screen 16, the left lateral light $50_l$ is extinguished by the shutter $63_l$ and the right lateral light $50_r$ is released by the shutter $63_r$. The beam of the right lateral light-sources $51_r$ immediately illuminates the right wing $66_r$ of a reflecting device, which every observer is wearing in the front of his eyes. The wing may consist of a fine wire gate covered with a white or fluorescent paint, or it may consist of clear glass which is transparent as long as no lateral light is thrown thereupon. Only in this dark condition the eye may look through the wing and perceive the picture projection on the screen 16. But being illuminated by the lateral light, the wing is throwing such a strong, homogene neutralizing light into the eye, that an impression of a picture projection on the screen 16 is impossible. By turning the wings $66_l$, $66_r$ in the joints $68_l$, $68_r$, each observer may regulate the intensity of the lateral light beams $50_l$, $50_r$ at will. Choosing the period of the alternation of the left-eye and right-eye picture projections with regard to the dark interval it is evident that a three-dimensional impression of the moving pictures may be attained.

Figure 17:
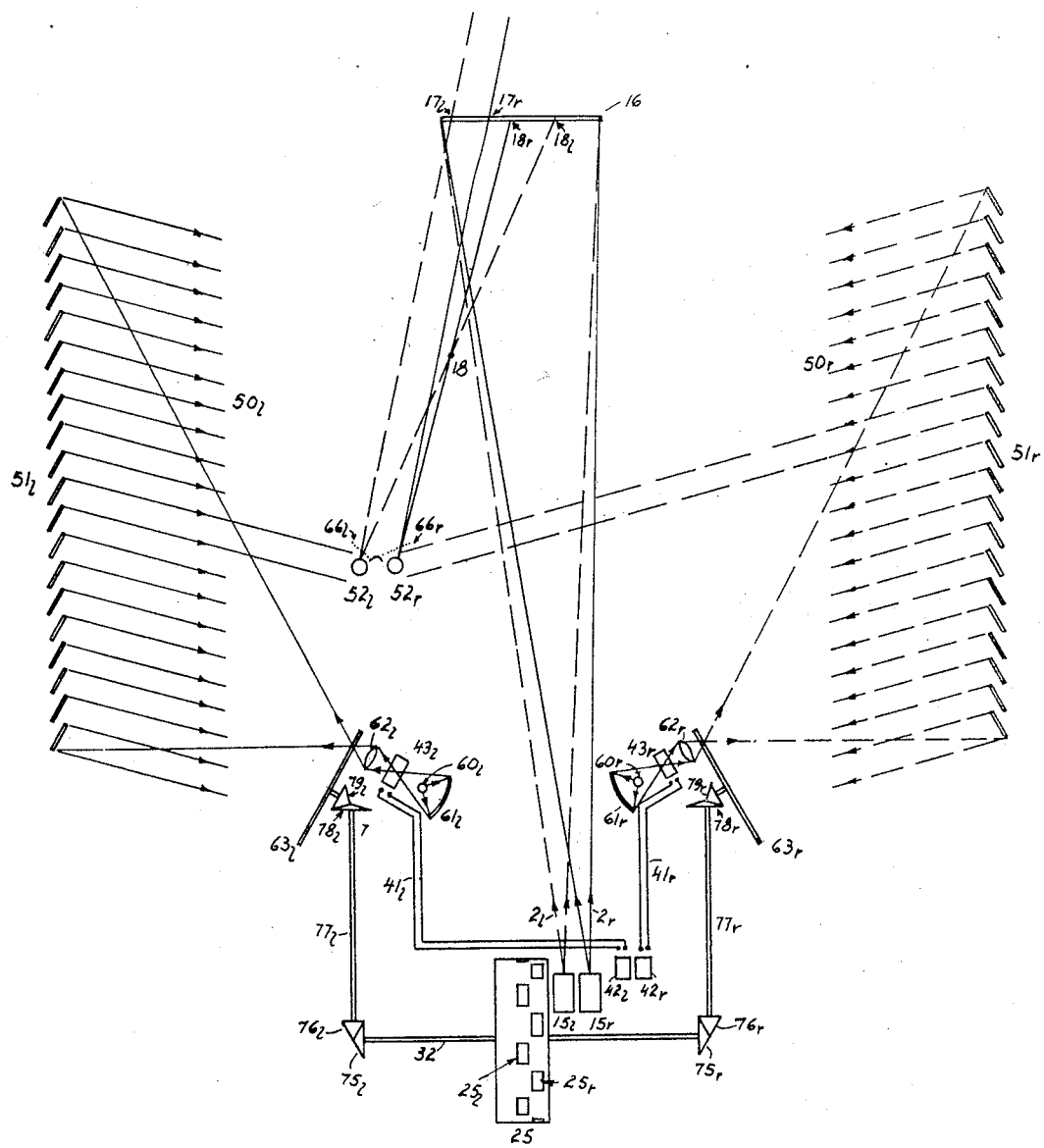
Fig. 17 is a diagrammatical representation in plan of the interior of a theater, showing in opposing relation rows of lateral lights which may be alternately extinguished and released by means of rotating shutters or other suitable mechanical devices.

By way of example, I show in Fig. 17, by diagrammatic plan, an arrangement of means or apparatus whereby to extinguish and release alternately the lights on the side of the theater, synchronously with the projection of the left- and right-eye pictures. Rotating in connection with the drum-shaped shutter 25 is a shaft 32. The shutter $63_l$ at the left-hand side is operated from the shaft 32 through the cooperating bevel gears $75_l$, $76_l$, shaft $77_l$, and cooperating bevel gears $78_l$, $79_l$. The shutter $63_r$, at the right-hand side is operated from shaft 32 through the cooperating bevel gears $75_r$, $76_r$, shaft $77_r$, and cooperating bevel gears $78_r$, $79_r$. The shutters $63_l$, $63_r$ having two opaque sections are rotated four times as fast as the shutter 25, which has eight openings $25_l$, $25_r$ in each row.

The principles of stereoptical seeing are well known and need, therefore, no detailed discussion.

Figs. 6 and 12 illustrate diagrammatically the effect of a left-eye picture and of a right-eye picture of an observer. The points $17_l$ and $17_r$ or $18_l$ and $18_r$ represent the illustration of a certain object in the left-eye picture or the right-eye picture respectively. While these two pictures are represented as being simultaneously projected on the screen, it must be kept in mind that their projections are performed in succession, the succession being so quick, however, that an observer will not become aware thereof but will have the same impression as that which a simultaneous presentation to the eyes would create. The object shown in $17_l$ or $17_r$ respectively, will appear to the spectator to be infinitely remote. Another object shown in $18_l$ or $18_r$ respectively, will appear to be located in the point 18.

Instead of red and green colors for the lateral lights $51_l$, $51_r$ and for the beams $2_l$, $2_r$ and $2_n$, other colors or color compositions may be used. As a mixture of complementary colors results in white or grey, the impression created by the successive projections will substantially equal that which would be created by the use of uncolored lights.

If the left-eye pictures and right-eye pictures are taken through red-yellow filters and green-blue filters respectively and are projected in the corresponding colors later on the pictures will appear in natural colors.

Various changes in the heretofore described arrangement and method may be made without departing from the spirit of the invention.

I claim:

1. The method of producing stereoscopic pictures which comprises producing light of different wave lengths for each eye, so as to bring the eyes into different states of adaptation forming right and left images with sufficient rapidity to produce persistence of vision, and directing into each eye of the observer a beam of light neutralizing the image which that eye should not see.

2. The method of producing stereoscopic pictures which comprises producing light of different intensities and different wave lengths for each eye, so as to bring the eyes into different states of adaptation, forming right and left images with sufficient rapidity to produce persistence of vision, and directing into each eye of the observer a beam of light neutralizing the image which that eye should not see.

3. The method of producing stereoscopic pictures which comprises producing light of different wave lengths for each eye, so as to bring the eyes into different states of adaptation, forming right and left images with sufficient rapidity to produce persistence of vision, and directing into each eye of the observer a beam of light neutralizing the image which that eye should not see, said first mentioned images being formed in the dark intervals between the directing of the beams of light into the eyes.

4. The method of producing stereoscopic pictures comprising forming right and left images with sufficient rapidity to produce persistence of vision, directing into each eye of the observer a beam of light neutralizing the images which that eye should not see, and varying the intensity of the neutralizing beam of light in relation to the brightness of the images.

In testimony that I claim the foregoing as my invention, I have signed my name hereto.

NEWTON ARFSTEN.